US012797286B2

(12) United States Patent
Wang

(10) Patent No.: US 12,797,286 B2
(45) Date of Patent: Nov. 17, 2026

(54) MUSCLE RELAXATION DEVICE WITH ENHANCED COMPRESSIVE STRENGTH

(71) Applicant: Chih-Hung Wang, Taichung City (TW)

(72) Inventor: Chih-Hung Wang, Taichung City (TW)

( * ) Notice: Subject to any disclaimer, the term of this patent is extended or adjusted under 35 U.S.C. 154(b) by 190 days.

(21) Appl. No.: 18/610,537

(22) Filed: Mar. 20, 2024

(65) Prior Publication Data

US 2025/0134754 A1 May 1, 2025

(30) Foreign Application Priority Data

Oct. 26, 2023 (TW) ................................ 112141089

(51) Int. Cl.
*A61H 9/00* (2006.01)
*A61H 7/00* (2006.01)
*A61H 15/00* (2006.01)

(52) U.S. Cl.
CPC ........... *A61H 9/0092* (2013.01); *A61H 7/001* (2013.01); *A61H 15/00* (2013.01); *A61H 2015/0014* (2013.01); *A61H 2201/0103* (2013.01); *A61H 2201/0107* (2013.01); *A61H 2201/0161* (2013.01); *A61H 2201/1246* (2013.01); *A61H 2201/169* (2013.01); *A61H 2201/5056* (2013.01)

(58) Field of Classification Search
CPC ....... A61H 9/0092; A61H 7/001; A61H 15/00
See application file for complete search history.

(56) References Cited

U.S. PATENT DOCUMENTS

| | | | | |
|---|---|---|---|---|
| 4,773,104 | A * | 9/1988 | Wang | A61H 33/6036 4/492 |
| 6,287,225 | B1 * | 9/2001 | Touhey | F16K 15/202 473/593 |
| 2012/0035029 | A1 * | 2/2012 | Dye | B29C 45/00 482/132 |
| 2012/0122635 | A1 * | 5/2012 | Tsai | A63B 21/00047 482/132 |
| 2014/0114221 | A1 * | 4/2014 | Indermill | A61H 15/0092 601/120 |
| 2018/0289581 | A1 * | 10/2018 | Zook | A61H 7/005 |
| 2021/0364094 | A1 * | 11/2021 | Moore | F16K 3/314 |

* cited by examiner

*Primary Examiner* — Erin Mcgrath
(74) *Attorney, Agent, or Firm* — Faegre Drinker Biddle & Reath LLP

(57) ABSTRACT

A muscle relaxation device includes a main body unit and an air inflation unit. The main body unit has an axis a predetermined length along the axis, and a predetermined width perpendicular to the axis. The main body unit includes an inflatable member defining an inflation space, and a structural reinforcement layer covering an outer surface of the inflatable member and made of a material different from that of the inflatable member. The inflatable member is changeable between an inflated state, in which air pressure in the inflation space ranges from 2 psi to 35 psi, and a deflated state, in which the air pressure in the inflation space is less than 2 psi. The air inflation unit is connected to the main body unit for guiding air into and out of the inflation space.

13 Claims, 14 Drawing Sheets

MUSCLE RELAXATION DEVICE WITH ENHANCED COMPRESSIVE STRENGTH

CROSS-REFERENCE TO RELATED APPLICATION

This application claims priority to Taiwanese Invention Patent Application No. 112141089, filed on Oct. 26, 2023, and incorporated by reference herein in its entirety.

FIELD

The present disclosure relates to a muscle relaxation device, more particularly to a muscle relaxation device with enhanced compressive strength.

BACKGROUND

Referring to FIG. 1, a foam roller 1 commonly seen in the market is usually formed using a single material layer 11 to form several massaging portions 111 for contacting the body of a user. Through this, different massaging effects can be achieved by pressing or rolling the foam roller 1 on the body of the user.

However, since the foam roller 1 is made of the single material layer 11, the massaging effect generated when the foam roller 1 is in contact with the body of the user is monotonous and cannot be changed, so that use of the foam roller 1 cannot meet the massaging needs of different users or different body parts thereof.

Since the foam roller 1 is cylindrical with a considerable volume and cannot be folded, it may occupy a large amount of space during storage.

SUMMARY

Therefore, an object of the present disclosure is to provide a muscle relaxation device that can produce different pressing effects relative to the muscles of different body parts of a user, that has good compressive strength, and that can be folded to reduce an occupied space, thereby improving space efficiency, portability, and safety in use thereof.

According to one aspect of this disclosure, the muscle relaxation device includes a main body unit and an air inflation unit. The main body unit has an axis, a predetermined length along the axis, and a predetermined width perpendicular to the axis. The main body unit includes an inflatable member defining an inflation space, and a structural reinforcement layer covering an outer surface of the inflatable member and made of a material different from a material of the inflatable member. The inflatable member is changeable between an inflated state, in which air pressure in the inflation space ranges from 2 psi to 35 psi, and a deflated state, in which the air pressure in the inflation space is less than 2 psi. The air inflation unit is connected to the main body unit for guiding air into and out of the inflation space.

Another object of the present disclosure is to provide a muscle relaxation device that can alleviate at least one of the drawbacks of the prior art.

According to another aspect of this disclosure, the muscle relaxation device includes a main body unit and an air inflation unit. The main body unit is cylindrical having an axis, and has a predetermined length along the axis, and a predetermined width perpendicular to the axis. The main body unit includes an inflatable member made of rubber or synthetic rubber and defining an inflation space, a structural reinforcement layer covering an outer surface of the inflatable member and made of a material different from a material of the inflatable member, and a contact layer covering an outer surface of the structural reinforcement layer. The inflatable member is changeable between an inflated state, in which air pressure in the inflation space ranges from 2 psi to 35 psi, and a deflated state, in which the air pressure in the inflation space is less than 2 psi. The air inflation unit is connected to the main body unit for guiding air into and out of the inflation space.

BRIEF DESCRIPTION OF THE DRAWINGS

Other features and advantages of the disclosure will become apparent in the following detailed description of the embodiments with reference to the accompanying drawings. It is noted that various features may not be drawn to scale.

DETAILED DESCRIPTION

Figure 1:
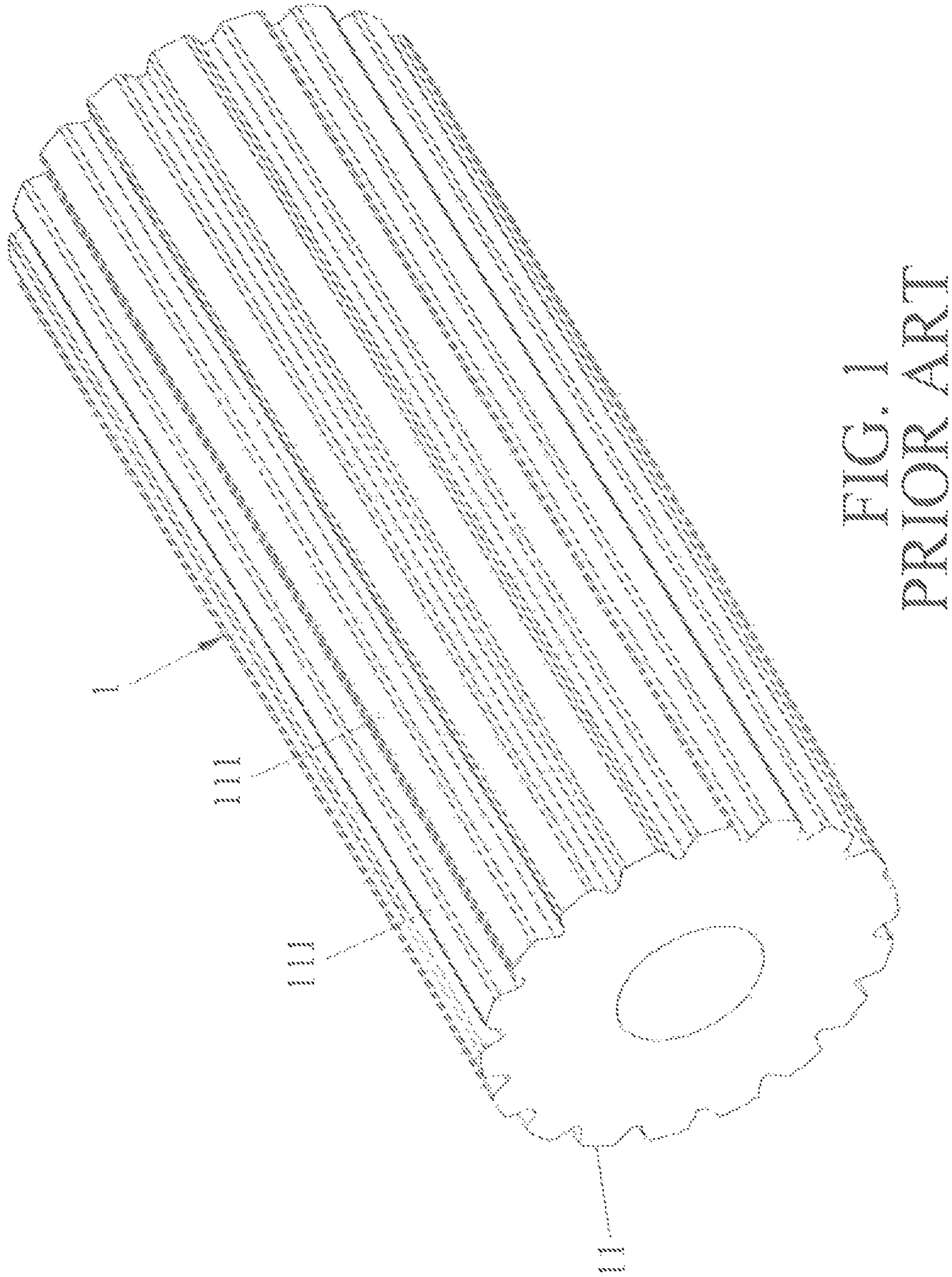
FIG. 1 PRIOR ART
FIG. 1 is a perspective view of a conventional foam roller.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
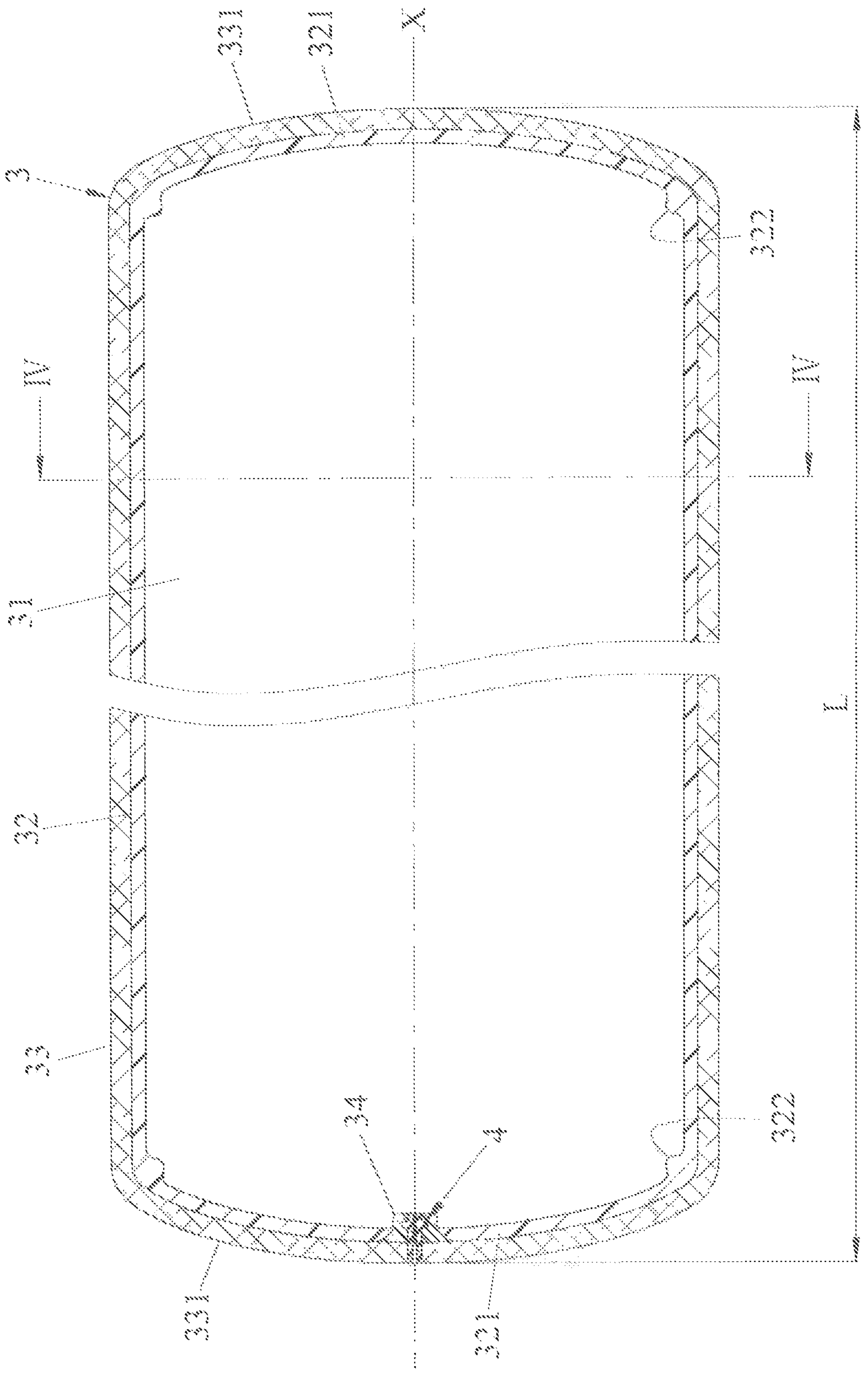
FIG. 2 is fragmentary sectional view of a muscle relaxation device according to the first embodiment of the present disclosure with an inflatable member thereof in an inflated state.
Figure 3:
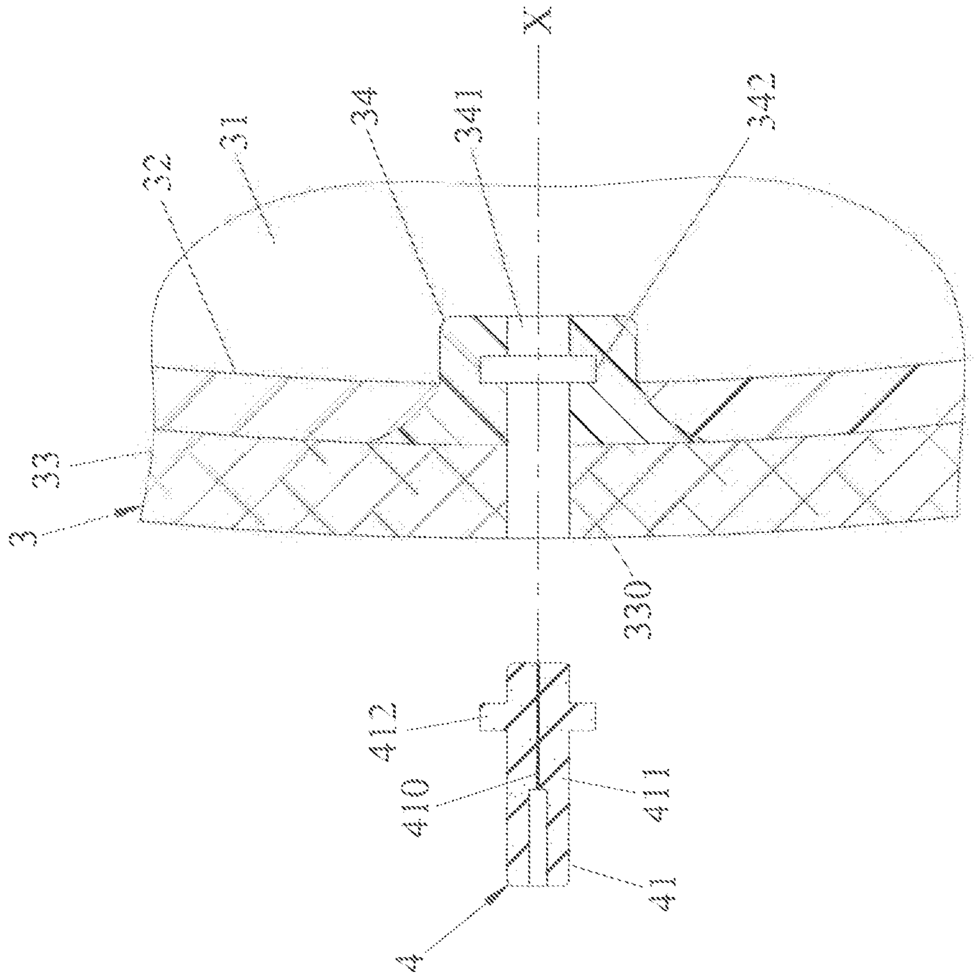
FIG. 3 is an enlarged fragmentary sectional view of a portion of FIG. 2, with an air inflation unit removed for the sake of clarity.
Figure 4:
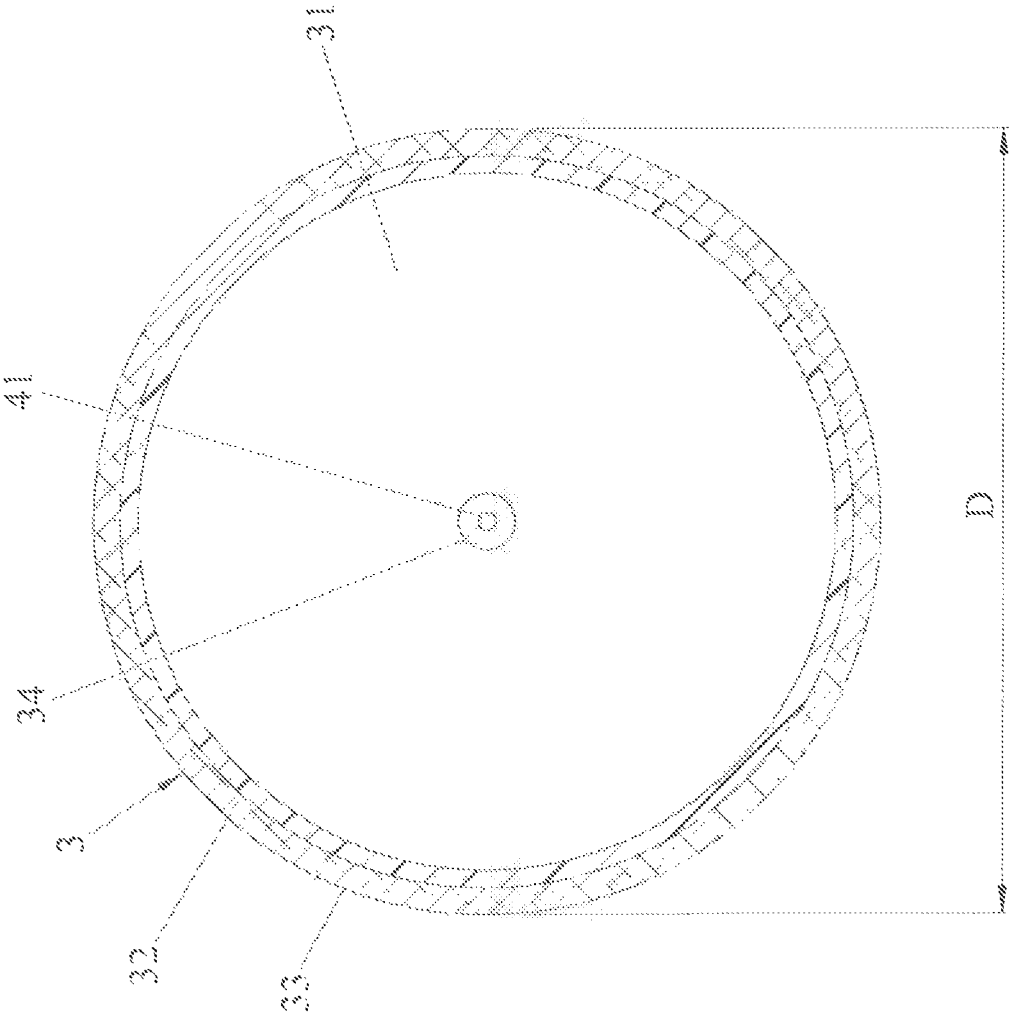
FIG. 4 is a sectional view taken along line IV-IV of FIG. 2.

Referring to FIGS. 2 to 4, a muscle relaxation device according to the first embodiment of the present disclosure includes a main body unit 3 and an air inflation unit 4.

The main body unit 3 is cylindrical having an axis (X) extending in a longitudinal direction, and has a predetermined length (L) along the axis (X) and a predetermined width (D) perpendicular to the axis (X). The predetermined length (L) ranges from 5 inches to 50 inches, preferably, 36 inches. The predetermined width (D) ranges from 2 inches to 15 inches, preferably, 6 inches. The main body unit 3 includes an inflatable member 32 defining an inflation space 31 and having two ends 321 opposite to each other along the axis (X), a structural reinforcement layer 33 covering an outer surface of the inflatable member 32, and a mounting seat 34 disposed on and connected to one of the ends 321 of the inflatable member 32.

The inflatable member 32 is made of rubber or synthetic rubber, and is made by using a rubber or synthetic rubber sheet and a forming mold. The rubber or synthetic rubber sheet is first folded for multiple times, and then directly pressed and molded in the forming mold. Through the aforesaid process, the inflatable member 32 is formed with two annular protrusions 322 extending from an inner surface thereof, respectively proximate to the ends 321 thereof, and surrounding the axis (X). It should be noted that, since the method of manufacturing the inflation member 32 is a known in the art and is not a technical feature of the present disclosure, details thereof are omitted herein. Furthermore, the annular protrusions 322 may be formed at different positions due to differences in methods of the pressure molding, and should not be limited to the disclosed embodiment.

Figure 6:
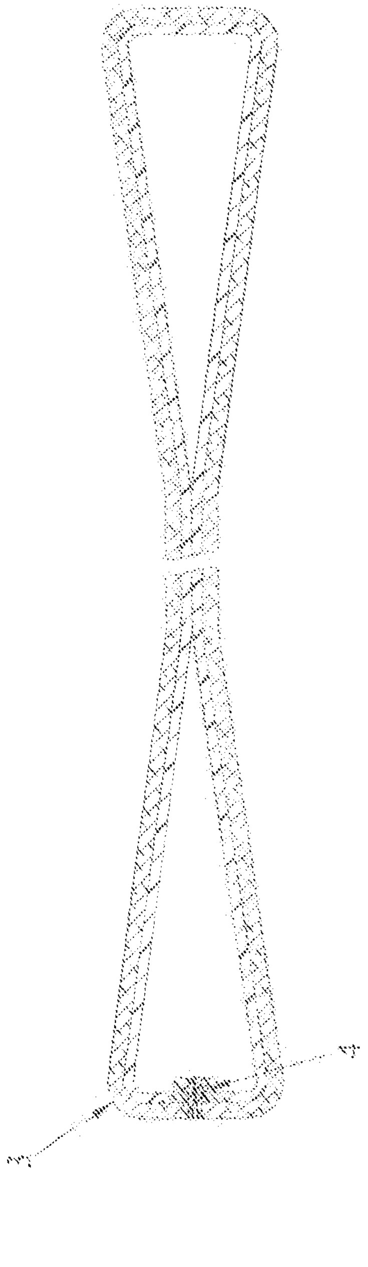
FIG. 6 is a view similar to FIG. 2, but with the inflatable member in a deflated state.

The inflatable member 32 is changeable between an inflated state (see FIGS. 2 and 4) and a deflated state (see FIG. 6). In the inflated state, air pressure in the inflation space 31 ranges from 2 psi to 35 psi, preferably 10 psi. In the deflated state, the air pressure in the inflation space 31 is less than 2 psi.

The structural reinforcement layer 33 can be made from at least one of yarn, woven fabric, PVC mesh fabric, mesh fabric (made using a woven or textile method), chemical fabric, and nylon. In this embodiment, the structural reinforcement layer 33 is made by winding a yarn around the outer surface of the inflatable member 32 until it completely covers the outer surface of the inflatable member 32. Through this, the compressive strength of the inflatable member 32 can be increased, so that the overall appearance of the inflatable member 32 can be maintained and the inflatable member 32 cannot be easily damaged when the inflatable member 32 is pressed and the air pressure inside is high. The structural reinforcement layer 33 has two ends 331 opposite to each other along the axis (X), and is formed with a through hole 330 in one of the ends 331 thereof.

It should be noted that the yarn is not limited to being wound around the outer surface of the inflatable member 32. In other variations of this embodiment, the yarn may be intertwined in a braided fashion around the outer surface of the inflatable member 32. It is worth noting that, when the material of the structural reinforcement layer 33 is woven fabric, PVC mesh fabric, or mesh fabric, the material is coupled to the outer surface of the inflatable member 32 in a bonding manner; or the material composed of a yarn wound around and connected to a composite material of the PVC mesh fabric is coupled to the outer surface of the inflatable member 32. Since the above method is known in the art, a detailed description thereof is omitted herein.

The mounting seat 34 defines a mounting hole 341 extending along the axis (X) and aligning and communicating with the through hole 330, and has an annular groove 342 surrounding the axis (X) and formed in a wall that defines the mounting hole 341.

In this embodiment, the air inflation unit 4 includes an inflation valve 41 connected to the main body unit 3. The inflation valve 41 has an elastic valve body 411 inserted into the mounting hole 341 through the through hole 330 and defining an inflation hole 410, and an annular flange 412 formed on an outer surface of the elastic valve body 411 and received in the annular groove 342.

Figure 5:
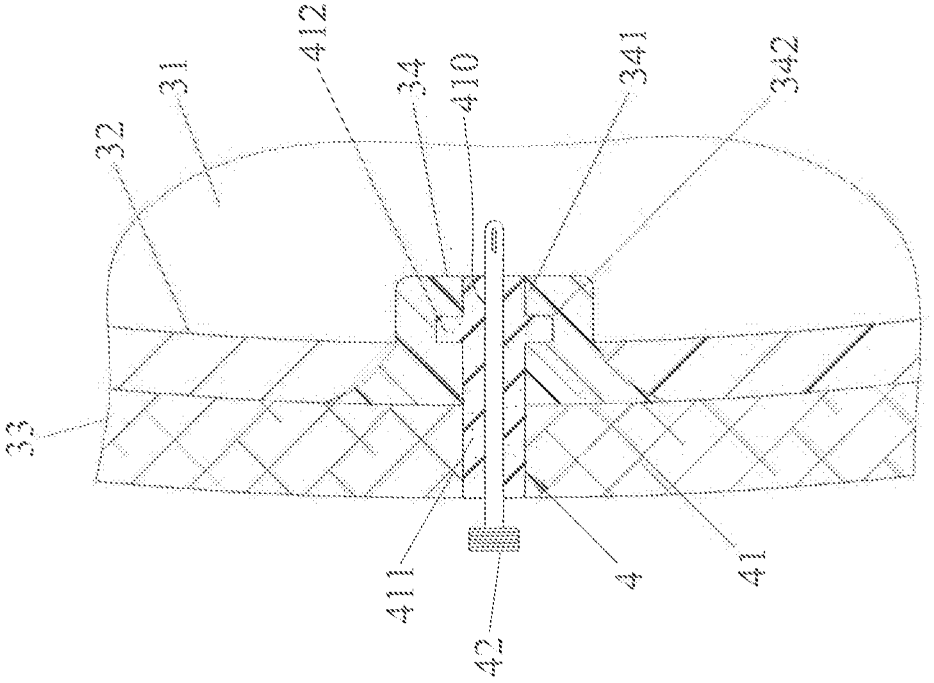
FIG. 5 is an enlarged fragmentary sectional view of a portion of FIG. 2, illustrating an inflation needle inserted into an elastic valve body of an inflation valve of the air inflation unit of the first embodiment to place the elastic valve body in an open state.

Referring to FIGS. 5 and 6, in combination with FIGS. 2 and 3, the elastic valve body 411 is changeable between a closed state (see FIG. 2) and an open state (see FIG. 5).

Because the through hole 330 of the structural reinforcement layer 33 and the mounting hole 341 of the mounting seat 34 are slightly smaller than the shape of the elastic valve body 411, the elastic valve body 411 can be press-fitted into the through hole 330 and the mounting hole 341 and positioned thereat when the elastic valve body 411 is inserted into the mounting hole 341. Hence, when the elastic valve body 411 is in the closed state, the inflation hole 410 is closed by the elastic body 411 to block communication between the inflation space 31 and the outside. As shown in FIG. 5, an inflation needle 42 is inserted through the inflation hole 410 to place the elastic valve body 411 in the open state. After the inflation needle 42 is connected to an inflation apparatus (not shown), air can be guided into the inflation space 31 through the inflation needle 42, or air in the inflation space 31 can be discharged through the inflation needle 42.

Through this, by simply guiding the air into and out of the inflation space 31 through the inflation valve 41, the inflatable member 32 can be changed between the inflated state and the deflated state. In the inflated state, the amount of air filled into the inflation space 31 can be controlled to adjust the air pressure inside the main body unit 3.

Referring back to FIGS. 2 and 4, when the inflatable member 32 is in the inflated state and the air pressure in the inflation space 31 is closer to 35 psi, the inflatable member 32 will expand more and the overall hardness thereof will be high.

When the inflatable member 32 is in the inflated state and the air pressure in the inflation space 31 is closer to or less than 10 psi, although the overall hardness thereof is lower than when the air pressure is closer to 35 psi, the main body unit 3 of the muscle relaxation device of this disclosure can allow a user to perform rolling and pressing actions on the device through any part of his/her body and more closely adapt to the curves of various parts of his/her body. Furthermore, because the structural reinforcement layer 33 has good external and internal pressure resistance effects, the entire device can still maintain the required structural strength, and can generate sufficient internal pressure to massage muscles or stimulate irregularly arranged myofascia. In addition, because of the presence of the structural reinforcement layer 33, when the main body unit 3 is accidentally damaged by an external force, there will be no instantaneous explosion due to high air pressure inside the inflatable member 32 but only gradual leakage of air therefrom. Hence, safety of use of the device of this disclosure can be greatly increased.

It is worth mentioning that the predetermined length (L) of the main body unit 3 ranges from 5 inches to 50 inches for the main body unit 3 to sufficiently span the entire back of the user. Hence, the main body unit 3 can be placed parallel to or perpendicular to the spine of the user, so as to be suitable for massaging the back of the user. Furthermore, the main body unit 3 is more stable when rolled along the thighs of the user. The predetermined width (D) of the main body unit 3 ranges from 2 inches to 15 inches, so that the main body unit 3 can provide stretching, pressing and other functions according to different positions or needs of the body of the user. The main body unit 3 has a weight ranging from 100 grams to 6000 grams, and the most ideal weight thereof is 1100 grams. Therefore, besides being used for muscle relaxation, the main body unit 3 can also be picked up and held by the user for muscle endurance training.

Referring back to FIGS. 5 and 6, when the inflatable member 32 is in the deflated state, air in the inflation space 31 can be discharged through the inflation needle 42 so that the main body unit 3 can be compressed and folded to facilitate storage and carriage thereof.

Figure 7:
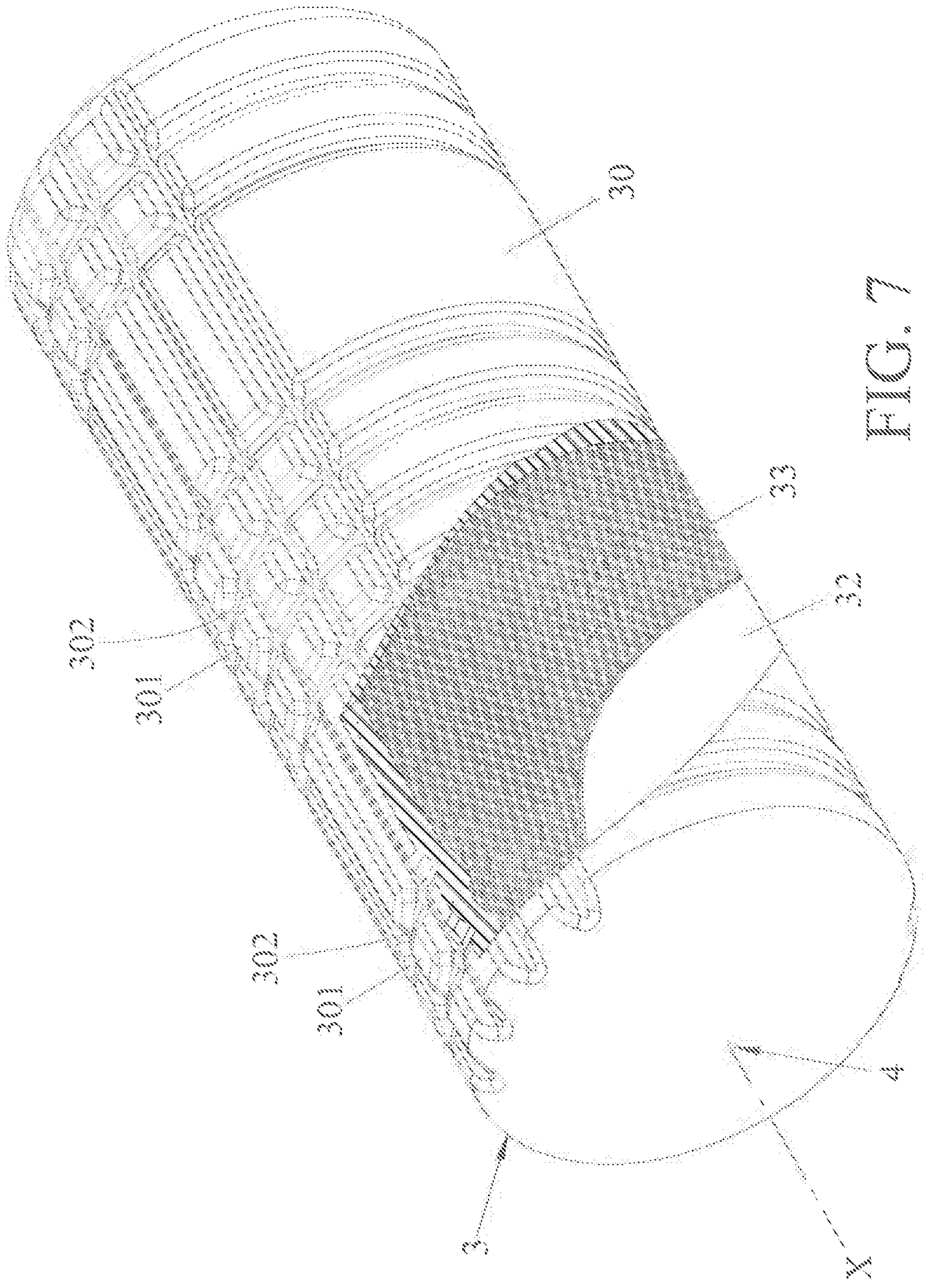
FIG. 7 is a partly sectional perspective view of the muscle relaxation device of the first embodiment, illustrating an outer surface of a structural reinforcement layer thereof being covered with a contact layer.

It should be noted that the main body unit 3 is not limited to only having the structural reinforcement layer 33 wound around the outer surface of the inflatable member 32. In other variations of this embodiment, a contact layer 30 may be covered on an outer surface of the structural reinforcement layer 33, as shown in FIG. 7. The contact layer 30 is made of a polymer material (such as TPE material, EVA foaming material, rubber, synthetic glue material, etc.), and has a plurality of protrusion structures 301 and a plurality of groove structures 302 formed and arranged on an outer surface thereof to enhance the massaging effect. In actual implementation, the contact layer 30 may not have the protrusion and groove structures 301, 302, but may have a layer of fabric or mesh fabric attached to an outer surface of the polymer material to form the contact layer 30, or a fabric or mesh fabric may be directly covered on the outer surface of the structural reinforcement layer 33 to form the contact layer 30. Hence, the forming of the contact layer 30 on the outer surface of the structural reinforcement layer 33 is not limited to the disclosed embodiment.

Figure 8:
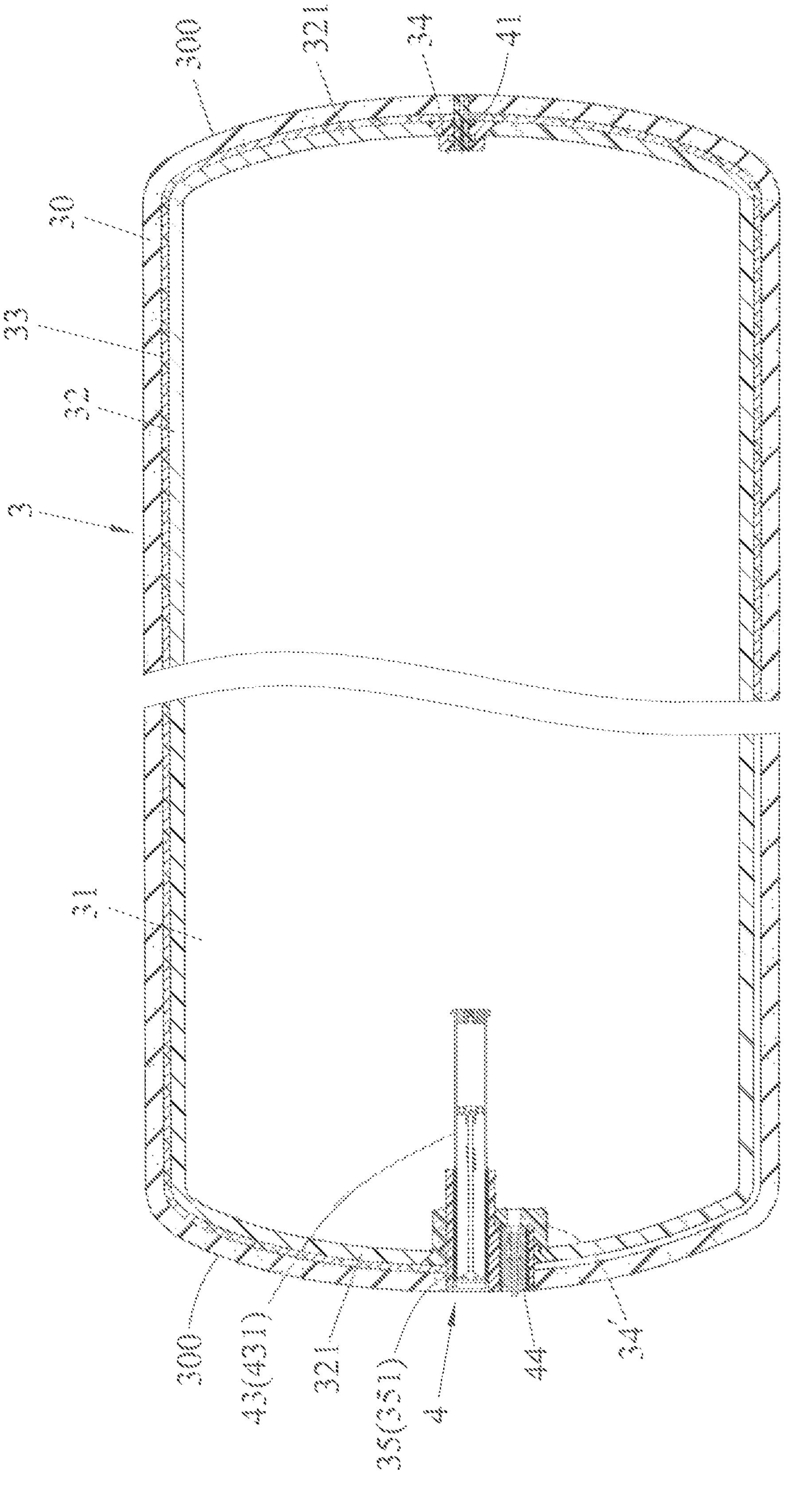
FIG. 8 is a fragmentary sectional view of a muscle relaxation device according to the second embodiment of the present disclosure with an inflatable member thereof in an inflated state.
Figure 9:
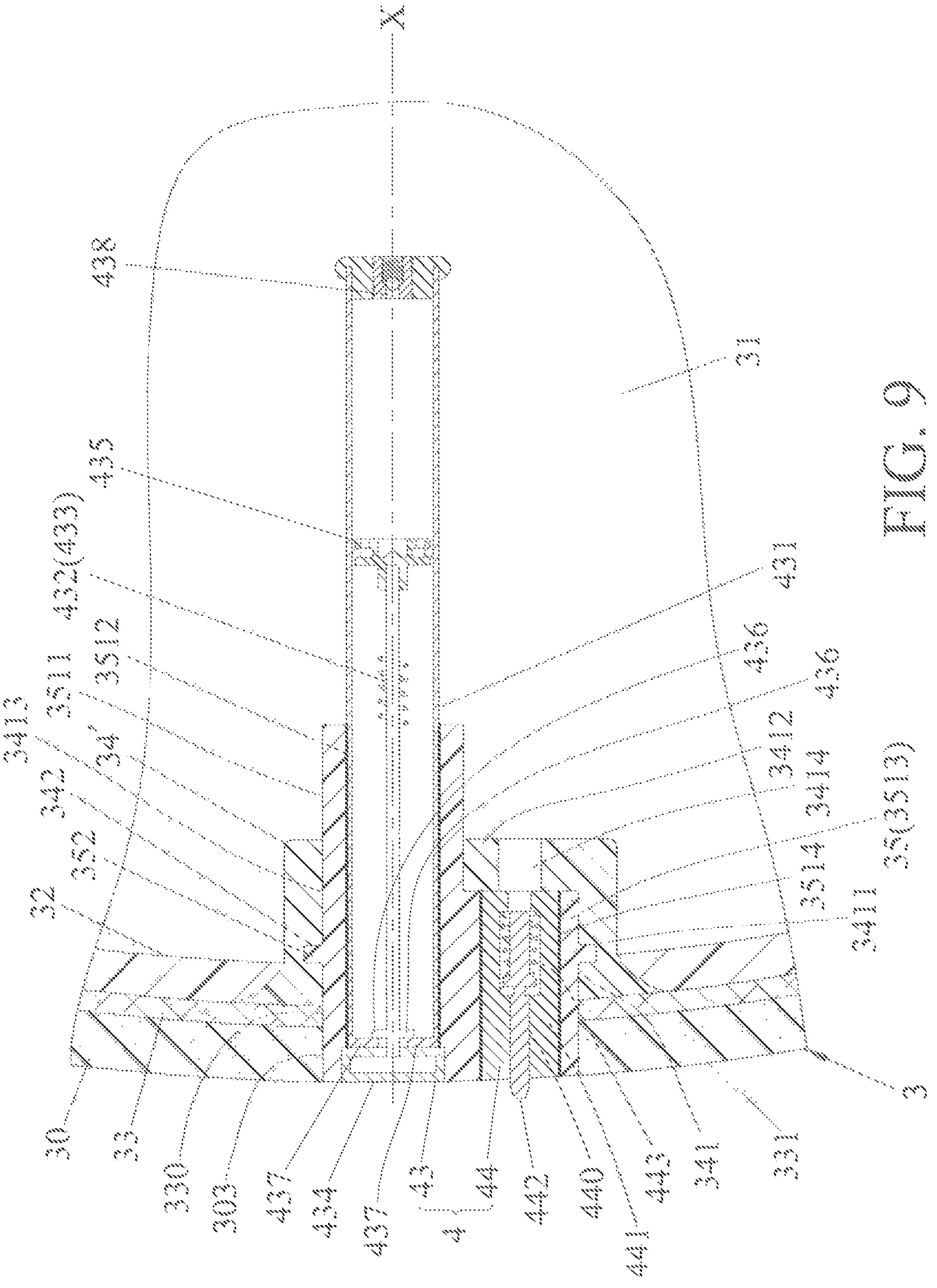
FIG. 9 is an enlarged fragmentary sectional view of a portion of FIG. 8, illustrating an inflator and a valve assembly of an air inflation unit of the second embodiment.
Figure 10:
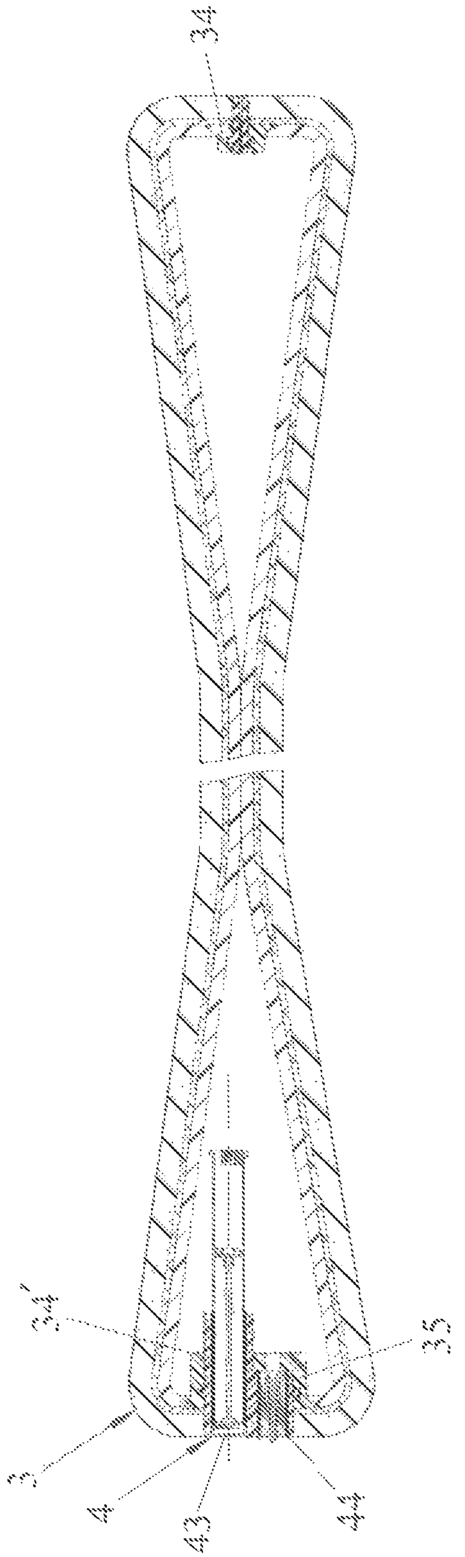
FIG. 10 is a view similar to FIG. 8, but with the inflatable member in a deflated state.
Figure 11:
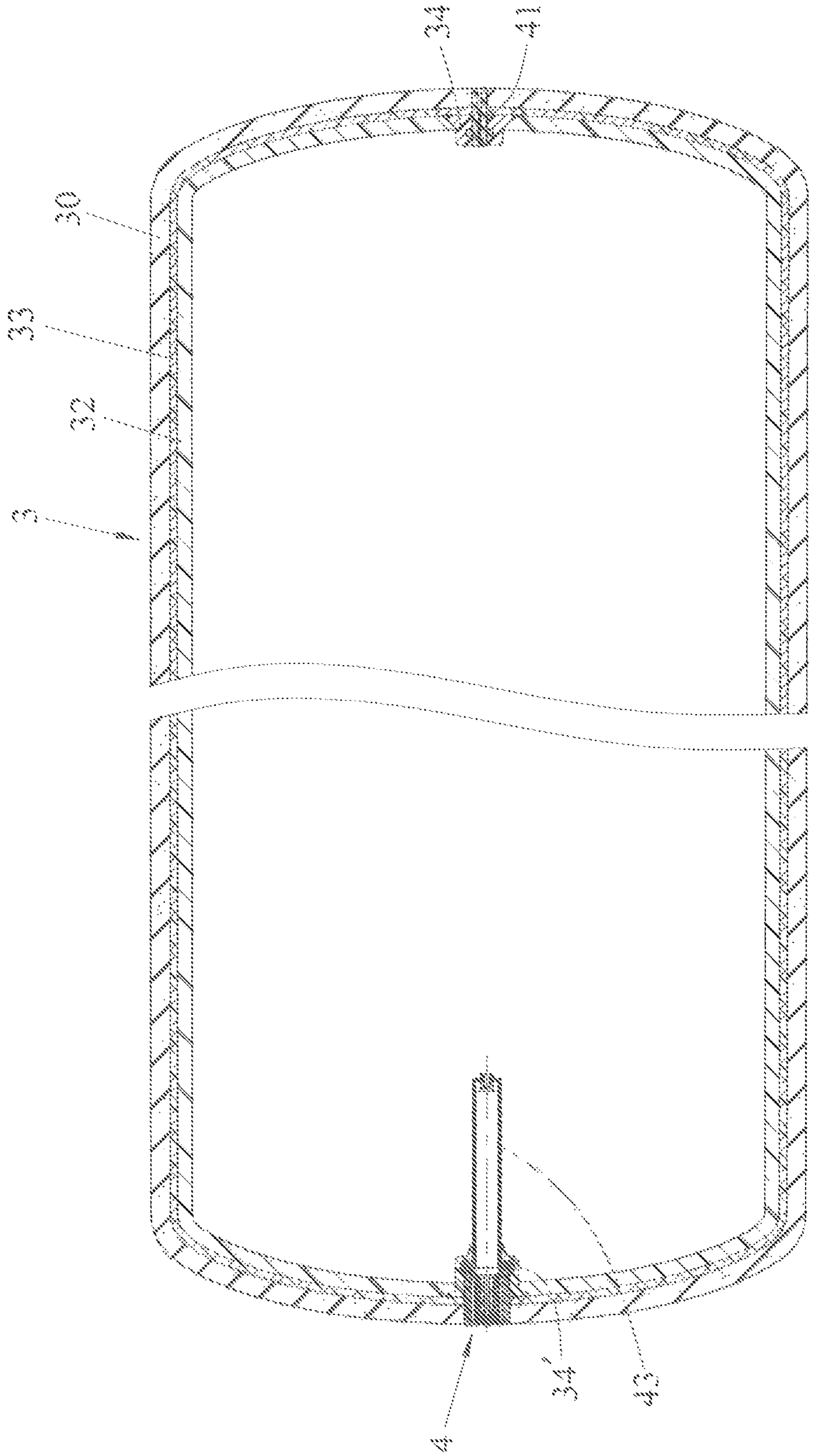
FIG. 11 is a fragmentary sectional view of a muscle relaxation device according to the third embodiment of the present disclosure.
Figure 12:
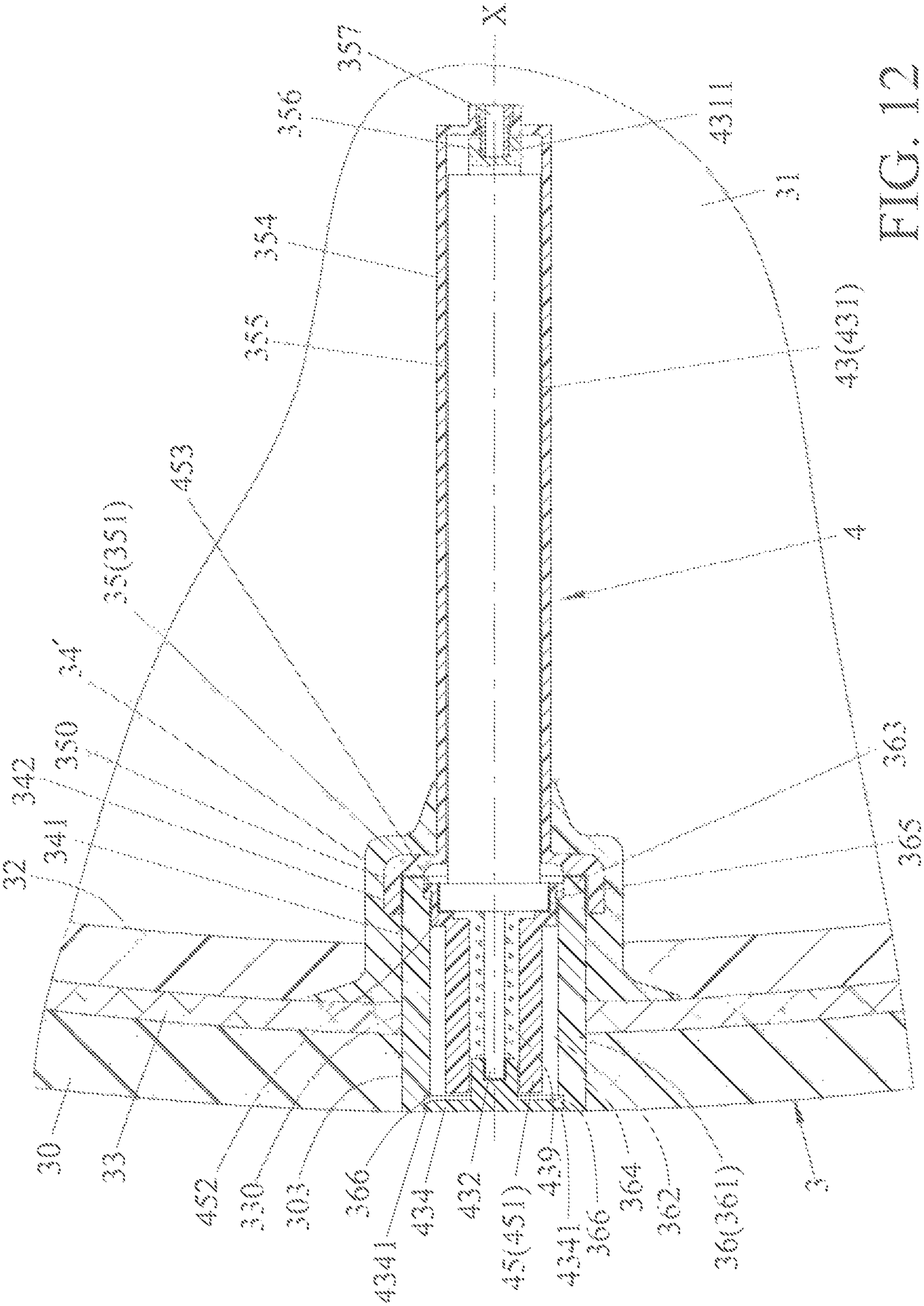
FIG. 12 is an enlarged fragmentary sectional view of a portion of FIG. 11, illustrating a grip portion of an inflator of an air inflation unit of the third embodiment engaged to a bushing.

Referring to FIGS. 8 to 10, the second embodiment of the muscle relaxation device of the present disclosure similarly comprises the main body unit 3 and the air inflation unit 4, and differs from the first embodiment in that the main body unit 3 of the second embodiment includes two mounting seats 34, 34', a contact layer 30, and a carrier 35. The mounting seats 34, 34' are respectively connected to the two ends 321 of the inflatable member 32 of the main body unit 3. The mounting seat 34 has a structure similar to that described in the first embodiment. The mounting seat 34' has the mounting hole 341 defined by a cylindrical wall 3411 and an end wall 3412 connected to an inner end of the cylindrical wall 3411, and further has a first through hole 3413 formed in the end wall 3412 and communicating with the mounting hole 341 along the axis (X), and a second through hole 3414 that is formed in the end wall 3412, that is radially spaced apart from the first through hole 3413, and that communicates with the mounting hole 341. The two ends 331 of structural reinforcement layer 33 are respectively formed with a through hole 330. The contact layer 30 covers an outer surface of the structural reinforcement layer 33, and has two ends 300 opposite to each other along the axis (X) and respectively formed with a through hole 303. The through hole 303 in each end 300 of the contact layer 30 aligns and communicates with the through hole 330 in one of the ends 331 of the structural reinforcement layer 33 and the mounting hole 341 of a corresponding one of the mounting seats 34, 34'. The carrier 35 has a carrier body 351 inserted into the mounting hole 341 of the mounting seat 34' through the corresponding through holes 303 and 330, and an annular flange 352 formed on an outer surface of the carrier body 351 and received in the annular groove 342 of the mounting seat 34'. The carrier body 351 has an L-shaped cross section with a long body portion 3511 extending along the axis (X) and a short body portion 3513 extending transversely to the long body portion 3511. The long body portion 3511 partially extends through the first through hole 3413 into the inflation space 31, and defines a first insertion hole 3512 extending along the axis (X) and communicating with inflation space 31 and the outside. The short body portion 3513 defines a second insertion hole 3514 parallel to the first insertion hole 3512 and communicating with the inflation space 31 through the second through hole 3414 and the outside.

The air inflation unit 4 of this embodiment further includes an inflator 43 inserted into the first insertion hole 3512, and a valve assembly 44 inserted into the second insertion hole 3514.

The inflator 43 includes an air cylinder 431 communicating with the inflation space 31 and the outside, and a piston rod 432 movably inserted into the air cylinder 431 along the axis (X). The piston rod 432 has a rod body 433, a grip portion 434 disposed on one end of the rod body 433, a plug portion 435 disposed on the other opposite end of the rod body 433, and two stop portions 436 formed on the rod body 433 in proximity to the grip portion 434 and opposite to each other in a direction transverse to the axis (X). The air cylinder 431 has two limiting portions 437 extending inwardly and radially from one end thereof for respectively blocking the stop portions 436, and an air outlet 438 located at the other opposite end thereof. During movement of the piston rod 432 relative to the air cylinder 431, air from the outside is guided into the inflation space 31. Since the principle of air inflation is known in the art, a detailed description thereof is omitted herein for the sake of brevity. In this embodiment, the air cylinder 431 is fixed to the long body portion 3511 of the carrier body 351 by gluing.

In this embodiment, the valve assembly 44 is a relief valve, and includes a valve seat 441 defining a flow channel 440, a valve stem 442 movably inserted into the flow channel 440, and a resilient member 443 disposed between the valve stem 442 and the valve seat 441 for biasing the valve stem 442 to close the flow channel 440. In this embodiment, the valve seat 441 is fixed to the short body portion 3513 of the carrier body 351 by gluing.

To inflate the main body unit 3 of this embodiment, it is only necessary to rotate the grip portion 434 so as to move the stop portions 436 away from the limiting portions 437, after which the piston rod 432 can be pulled and pushed back and forth along the axis (X) to drive air into the inflation space 31. To deflate the main body unit 3, it is only necessary to press the valve stem 442 so as to open the flow channel 440 and air in the inflation space 31 can be guided to flow to the outside through the flow channel 440. Through this configuration, apart from achieving the purpose of inflating or deflating the main body unit 3 anytime and anywhere, it is also possible to control the amount of air filled into the inflation space 31 so as to adjust the air pressure in the inflation space 31. It should be further noted that, in the second embodiment, the inflation valve 41 may also be used for deflation as described in the first embodiment depending on the actual use requirement of the user, and is not limited to what is disclosed herein.

Referring to FIGS. 11 to 14, the third embodiment of the muscle relaxation device of the present disclosure similarly comprises the main body unit 3 and the air inflation unit 4, and is substantially identical to the second embodiment, but differs from the second embodiment in that the main body unit 3 further includes a bushing 36, and the carrier body 351 of the carrier 35 is engaged to the mounting seat 34'. The carrier body 351 has an annular base wall 350 engaged to the annular groove 342, and a cylindrical wall 354 extending from the base wall 350 into the inflation space 31 along the axis (X) and defining an accommodating hole 355. The carrier body 351 further has an external thread portion 356 provided on one end of the cylindrical wall 354 that is opposite to the base wall 350 and defining a through hole 357. The bushing 36 is inserted into the mounting hole 341 of the mounting seat 34' through one of the through holes 303 in the contact layer 30 and the corresponding one of the through holes 330 in the structural reinforcement layer 33, and has a surrounding wall 361 surrounding the axis (X) and defining an accommodating space 362, an abutment portion 363 abutting against the base wall 350 of the carrier body 351, an outer end portion 364 opposite to the abutment portion 363 along the axis (X), a travel space 365 recessed from an inner annular surface of the abutment portion 363, and two engaging grooves 366 recessed from the outer end portion 364 and radially spaced apart from each other. In this embodiment, the abutment portion 363 is adhesively connected to the base wall 350 of the carrier body 351.

The air inflation unit 4 of this embodiment further includes a rotary knob 45 that is hollow, that is connected to the inflator 43 and that is received in the accommodating space 362 of the bushing 36. The air cylinder 431 of the inflator 43 is inserted into the accommodating hole 355 of the carrier body 351 and is threaded to the external thread portion 356, the piston rod 432 thereof is retractably inserted into the air cylinder 431, and the grip portion 434 thereof is adhered to one end of the piston rod 432 that extends into the hollow rotary knob 45, and abuts removably against the bushing 36. The inflator 43 further includes a resilient member 439 sleeved on the piston rod 432 and having two opposite ends respectively abutting against the grip portion 434 and the air cylinder 431. The air cylinder 431 has a threaded hole 4311 threadedly engaged with the external thread portion 356. The grip portion 434 has two protrusions 4341 respectively formed at two sides thereof that are opposite to each other in the direction transverse to the axis (X) and respectively and slidably movable in the engaging grooves 366. The designs of the engaging grooves 366 and the protrusions 4341 are also known in the art, so a detailed description thereof is omitted herein.

In this embodiment, the rotary knob 45 is a stepped hollow cylinder, and has a gripping portion 451, an engaging portion 452 opposite to the gripping portion 451 and adhered to the air cylinder 431, and an annular protrusion 453 protruding outwardly and radially from the engaging portion 452 and received in the travel space 365.

Figure 13:
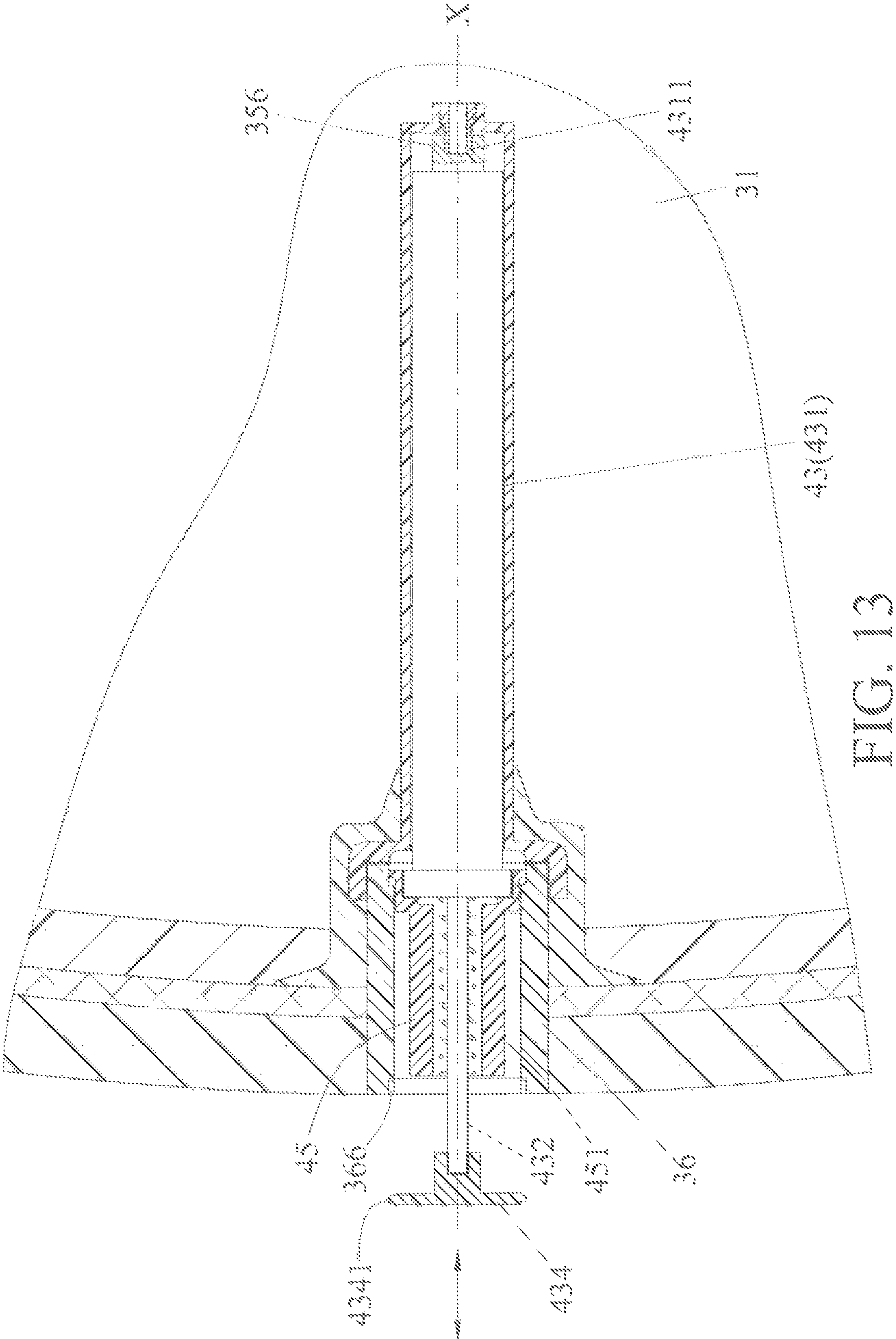
FIG. 13 is a view similar to FIG. 12, but with the grip portion of the inflator disengaged from the bushing for air inflation.
Figure 14:
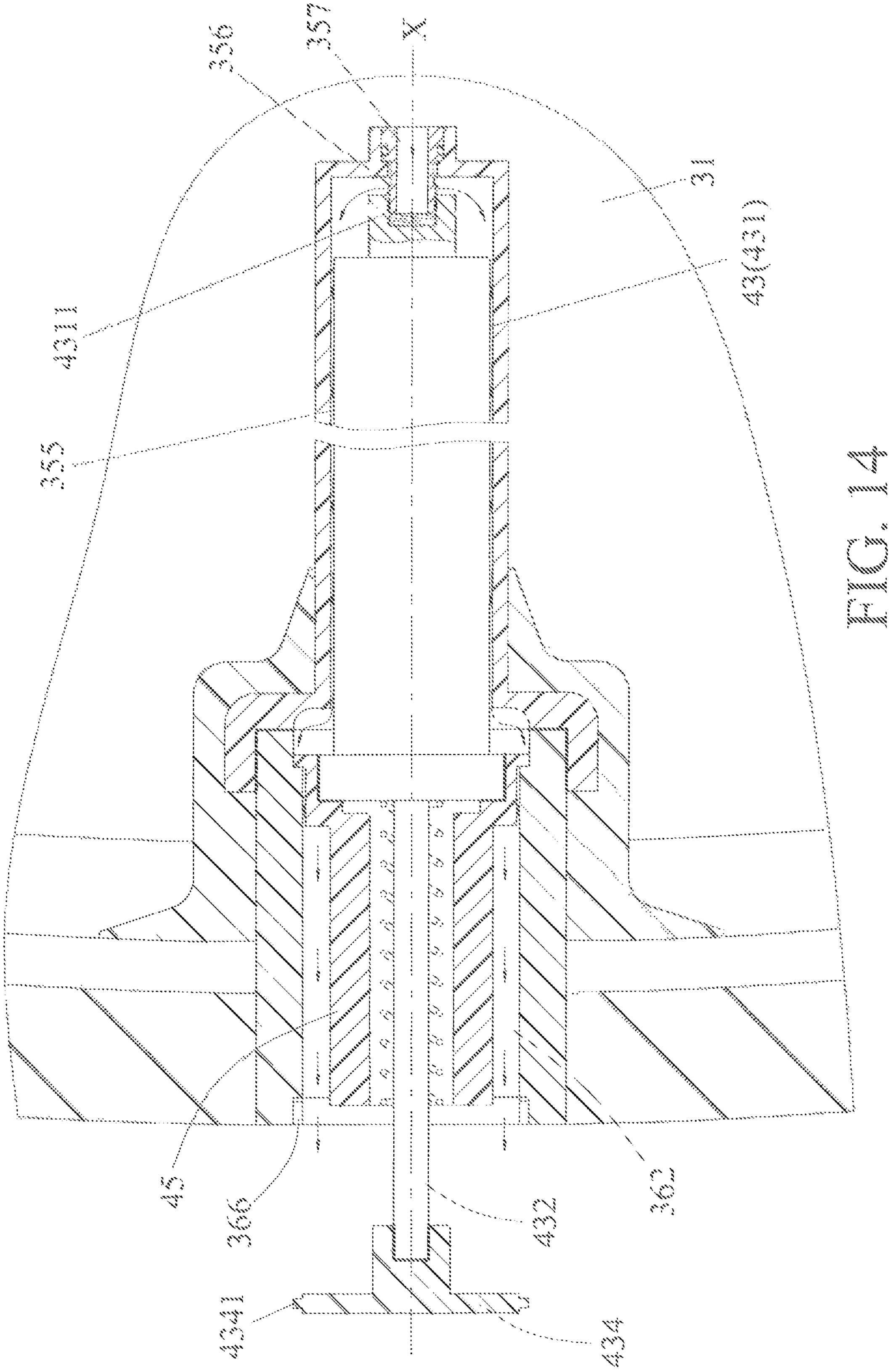
FIG. 14 is a view similar to FIG. 12, but with an air cylinder away from an external thread portion of a carrier for air deflation.

The inflator 43 is rotatable relative to the external thread portion 356 of the carrier body 351 between an inflation position (see FIG. 13) and a deflation position (see FIG. 14). In the inflation position, the threaded hole 4311 of the inflator 43 is threadedly engaged with the external thread portion 356 in an airtight manner to block passage of air. In the deflation position, the threaded hole 4311 of the inflator 43 is loosely engaged with the external thread portion 356 to form a gap therebetween for passage of air therethrough so that the through hole 357 in the external thread portion 356 can communicate with the accommodating hole 355.

To inflate the main body unit 3 of this embodiment, it is only necessary to rotate the grip portion 434 of the inflator 43 so as to disengage the protrusions 4341 thereof from the respective engaging grooves 366 and thereby separate the grip portion 434 from the bushing 36, as shown in FIG. 13, after which the piston rod 432 is moved reciprocally along the axis (X) to inflate air into the inflation space 31. To deflate the main body unit 3, only a finger of the user is needed to rotate the gripping portion 451 of the rotary knob 45 and drive the air cylinder 431 of the inflator 43 to move away and loosen from the external thread portion 356 of the carrier body 351, thereby placing the inflator 43 in the deflation position, as shown in FIG. 14. Through this, air in the inflation space 31 can flow into the accommodating hole 355 through the gap between the external thread portion 356 and the threaded hole 4341, and out of the main body unit 3 after passing through the accommodating space 362 of the bushing 36 (see arrows in FIG. 14). Because the external thread portion 356 is slightly conical in shape, when the air cylinder 431 is rotated to move outwardly away from the external thread portion 356, the gap is formed between the external thread portion 356 and the threaded hole 4311 due to the size matching relationship therebetween. Since an internal structure of the air cylinder 431 is known in the art, a detailed description thereof is omitted herein. It should be further noted that, in the third embodiment, the inflation valve 41 may be used for deflation as described in the first embodiment depending on the actual use requirement of the user, and is not limited to what is disclosed herein.

Through the above description, the advantages of the aforementioned embodiments can be summarized as follows:

1. Through the presence of the structural reinforcement layer 33 that has a material different from the material of the inflatable member 32 and that completely covers the inflatable member 32 so as to have a laminated structure and a composite material design, the internal and external compressive strength of the inflatable member 32 can be increased, so that the device of this disclosure is not easily damaged. Furthermore, not only the softness and hardness during massage can be adjusted so that the device of this disclosure can be more adaptable to the various parts of the body of the user, but also sufficient pressure can be generated to produce different pressing effects on the muscles of different parts of the body of the user. Moreover, effects of muscle relaxation, rehabilitation, massage, stretching, and Pilates can be integrated into one to reduce costs.
2. When the inflatable member 32 is in the deflated state, air in the inflation space 31 can be discharged so that the main body unit 3 can be compressed and folded for convenience of storage and carriage thereof.
3. Because the structural reinforcement layer 33 is covered on the outer surface of the inflatable member 32, in use, the inflatable member 32 is provided with an additional layer of protection, so that accidental damage to the inflatable member 32 due to an external force can be avoided and the inflation effect of the inflatable member 32 will not be affected. Furthermore, because of the presence of the structural reinforcement layer 33, when the inflatable member 32 is accidentally damaged caused by an external force, there will be no instantaneous explosion due to the high-pressure air inside the inflatable member 32, but only gradual leakage of air from the inflation space 31, so that the safety of use of this disclosure can be greatly increased.
4. The weight of the device of this disclosure ranges 100 grams to 6000 grams, and the most ideal weight thereof is 1100 grams. Therefore, besides being used for muscle relaxation, the device of this disclosure can also be used by the user for muscle endurance training.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A muscle relaxation device, comprising:

a main body unit having an axis, a predetermined length along said axis, and a predetermined width perpendicular to said axis, said main body unit including an inflatable member defining an inflation space, and a structural reinforcement layer covering an outer surface of said inflatable member and made of a material different from a material of said inflatable member, said inflatable member being changeable between an inflated state, in which air pressure in said inflation space ranges from 2 psi to 35 psi, and a deflated state, in which said air pressure in said inflation space is less than 2 psi; and an air inflation unit connected to said main body unit for guiding air into and out of said inflation space;

wherein said structural reinforcement layer has an inner surface that faces said outer surface of said inflatable member;

wherein said inner surface of said structural reinforcement layer and said outer surface of said inflatable member are devoid of any protruding structures such that said inner surface of said structural reinforcement layer and said outer surface of said inflatable member are in tight and surface-to-surface contact with each other when said inflatable member is in the inflated state;

wherein said inflatable member has at least one annular protrusion extending integrally from an inner surface thereof; and wherein a thickness of said annular protrusion of said inflatable member in a direction transverse to said axis is greater than a thickness of any non-protruding portion of said inflatable member in said direction transverse to said axis.

2. The muscle relaxation device as claimed in claim 1, wherein said predetermined length ranges from 5 inches to 50 inches, and said predetermined width ranges from 2 inches to 15 inches.

3. The muscle relaxation device as claimed in claim 2, further comprising a contact layer covering an outer surface of said structural reinforcement layer.

4. The muscle relaxation device as claimed in claim 3, wherein said contact layer is made of a polymer material.

5. The muscle relaxation device as claimed in claim 1, wherein said main body unit further includes at least one mounting seat connected to said inflatable member, said structural reinforcement layer having two ends opposite to each other along said axis and being formed with a through hole in at least one of said two ends, said at least one mounting seat defining a mounting hole that extends along said axis and that communicates with said through hole, and having an annular groove that surrounds said axis and that is formed in a wall defining said mounting hole, said air inflation unit being inserted into said mounting hole through said through hole, and having at least one annular flange formed on an outer surface thereof and received in said annular groove.

6. The muscle relaxation device as claimed in claim 5, wherein said air inflation unit includes an inflation valve connected to said main body unit and having an elastic valve body that is inserted into said mounting hole through said through hole and that defines an inflation hole, said at least one annular flange being formed on an outer surface of said elastic valve body, said elastic valve body being changeable between a closed state, in which said inflation hole is closed by said elastic valve body to block communication between said inflation space and the outside, and an open state, in which said inflation hole is opened for guiding air into and out of said inflation space.

7. The muscle relaxation device as claimed in claim 6, wherein said air inflation unit further includes an inflator disposed on said main body unit for guiding air from the outside into said inflation space.

8. The muscle relaxation device as claimed in claim 1, wherein:

said main body unit further includes at least one mounting seat connected to said inflatable member, said structural reinforcement layer having two ends opposite to each other along said axis and being formed with a through hole in at least one of said two ends, said at least one mounting seat defining a mounting hole that extends along said axis and that communicates with said through hole, and having an annular groove that surrounds said axis and that is formed in a wall defining said mounting hole; and said main body unit further includes a carrier that is inserted into said mounting hole of said at least one mounting seat through said through hole and that has at least one annular flange formed on an outer surface of said carrier and received in said annular groove, and two insertion holes communicating with said inflation space and the outside, said air inflation unit including an inflator inserted into one of said insertion holes of said carrier for guiding air from the outside into said inflation space, and a valve assembly inserted into the other one of said insertion holes for guiding air in said inflation space to discharge to the outside.

9. The muscle relaxation device as claimed in claim 5, wherein said at least one mounting seat includes two mounting seats, said inflatable member having two ends opposite to each other along said axis, said two mounting seats being respectively connected to said two ends of said inflatable member, said air inflation unit including an inflator inserted into said mounting hole of one of said mounting seats for guiding air from the outside into and out of said inflation space, and an inflation valve inserted into said mounting hole of the other one of said mounting seats.

10. The muscle relaxation device as claimed in claim 8, wherein said inflator includes an air cylinder communicating with said inflation space and the outside, and a piston rod movably inserted into said air cylinder along said axis and having a grip portion, said valve assembly including a valve seat defining a flow channel, a valve stem movably inserted into said flow channel, and a resilient member disposed between said valve stem and said valve seat for biasing said valve stem to close said flow channel.

11. The muscle relaxation device as claimed in claim 9, wherein said main body unit further includes a carrier inserted into said mounting hole of one of said mounting seats and having a carrier body engaged to said one of said mounting seats, said carrier body having a cylindrical wall extending into said inflation space along said axis and defining an accommodating hole, and a thread portion provided on one end of said cylindrical wall that is opposite to said one of said mounting seats and defining a through hole, said air inflation unit including said inflator rotatably disposed in said carrier body, and a rotary knob connected to said inflator, said inflator being rotatable relative to said thread portion between an inflation position, in which said inflator is in airtight contact with said thread portion to block passage of air, and a deflation position, in which said inflator is loosened from said thread portion to form a gap therebetween for passage of air therethrough.

12. The muscle relaxation device as claimed in claim 1, wherein said structural reinforcement layer is made from at least one of yarn, woven fabric, PVC mesh fabric, chemical fabric, and nylon.

13. A muscle relaxation device, comprising:

a main body unit that is cylindrical having an axis, and that has a predetermined length along said axis, and a predetermined width perpendicular to said axis, said main body unit including an inflatable member made of rubber or synthetic rubber and defining an inflation space, a structural reinforcement layer covering an outer surface of said inflatable member and made of a material different from a material of said inflatable member, and a contact layer covering an outer surface of said structural reinforcement layer, said inflatable member being changeable between an inflated state, in which air pressure in said inflation space ranges from 2 psi to 35 psi, and a deflated state, in which said air pressure in said inflation space is less than 2 psi; and an air inflation unit connected to said main body unit for guiding air into and out of said inflation space;

wherein said structural reinforcement layer has an inner surface that faces said outer surface of said inflatable member;

wherein said inner surface of said structural reinforcement layer and said outer surface of said inflatable member are devoid of any protruding structures such that said inner surface of said structural reinforcement layer and said outer surface of said inflatable member are in tight and surface-to-surface contact with each other when said inflatable member is in the inflated state;

wherein said inflatable member has at least one annular protrusion extending integrally from an inner surface thereof; and wherein a thickness of said annular protrusion of said inflatable member in a direction transverse to said axis is greater than a thickness of any non-protruding portion of said inflatable member in said direction transverse to said axis.

* * * * *